No. 620,609. Patented Mar. 7, 1899.
E. S. PILLSBURY & F. SCHWEDTMANN.
MOTOR.
(Application filed Mar. 18, 1898.)
(No Model.) 6 Sheets—Sheet 2.
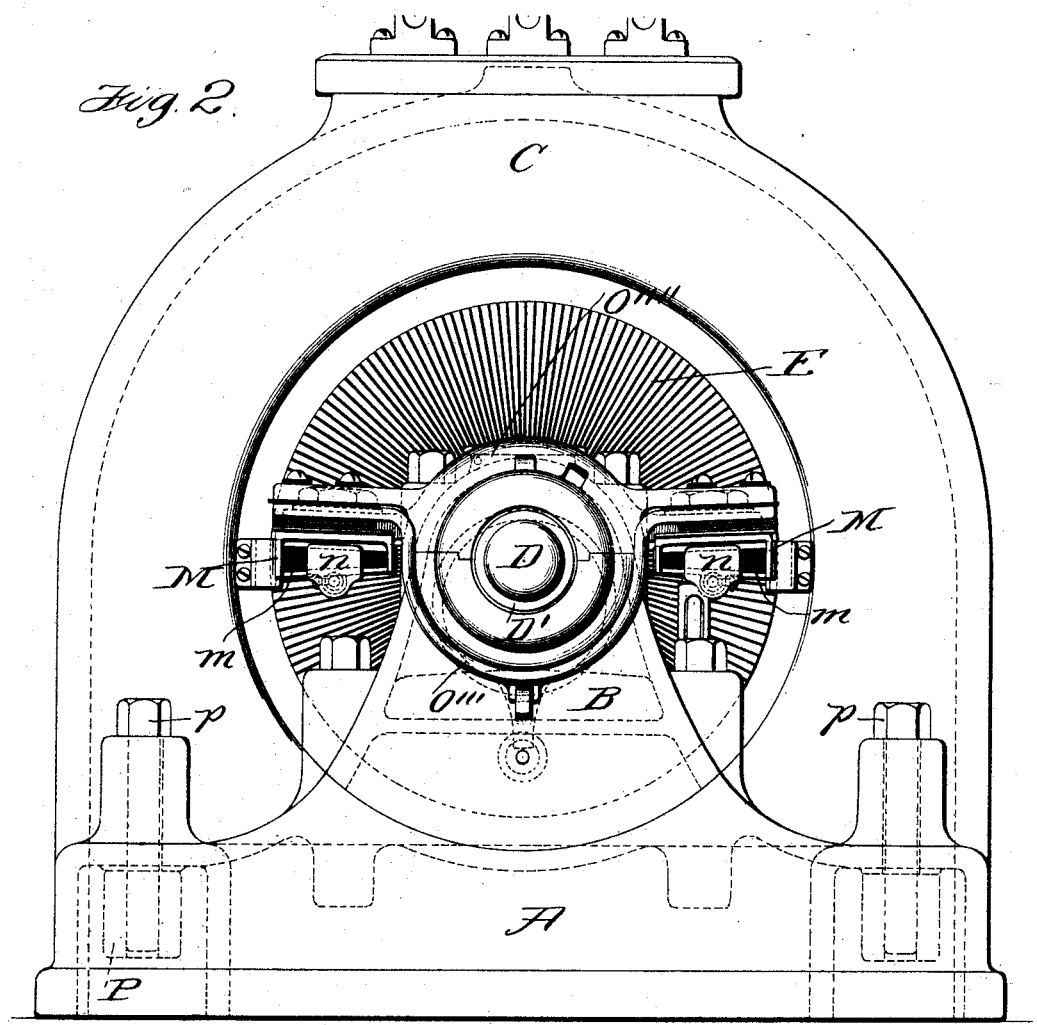
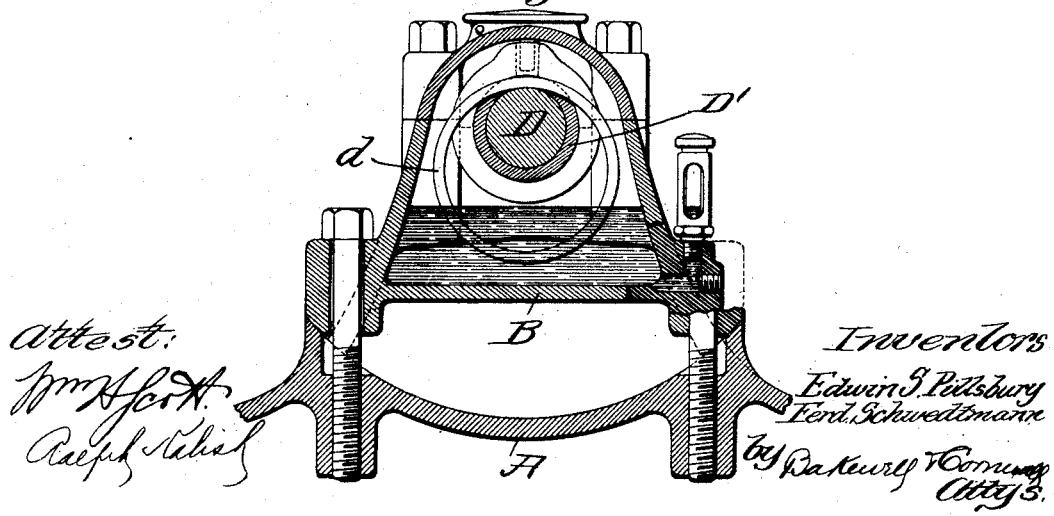

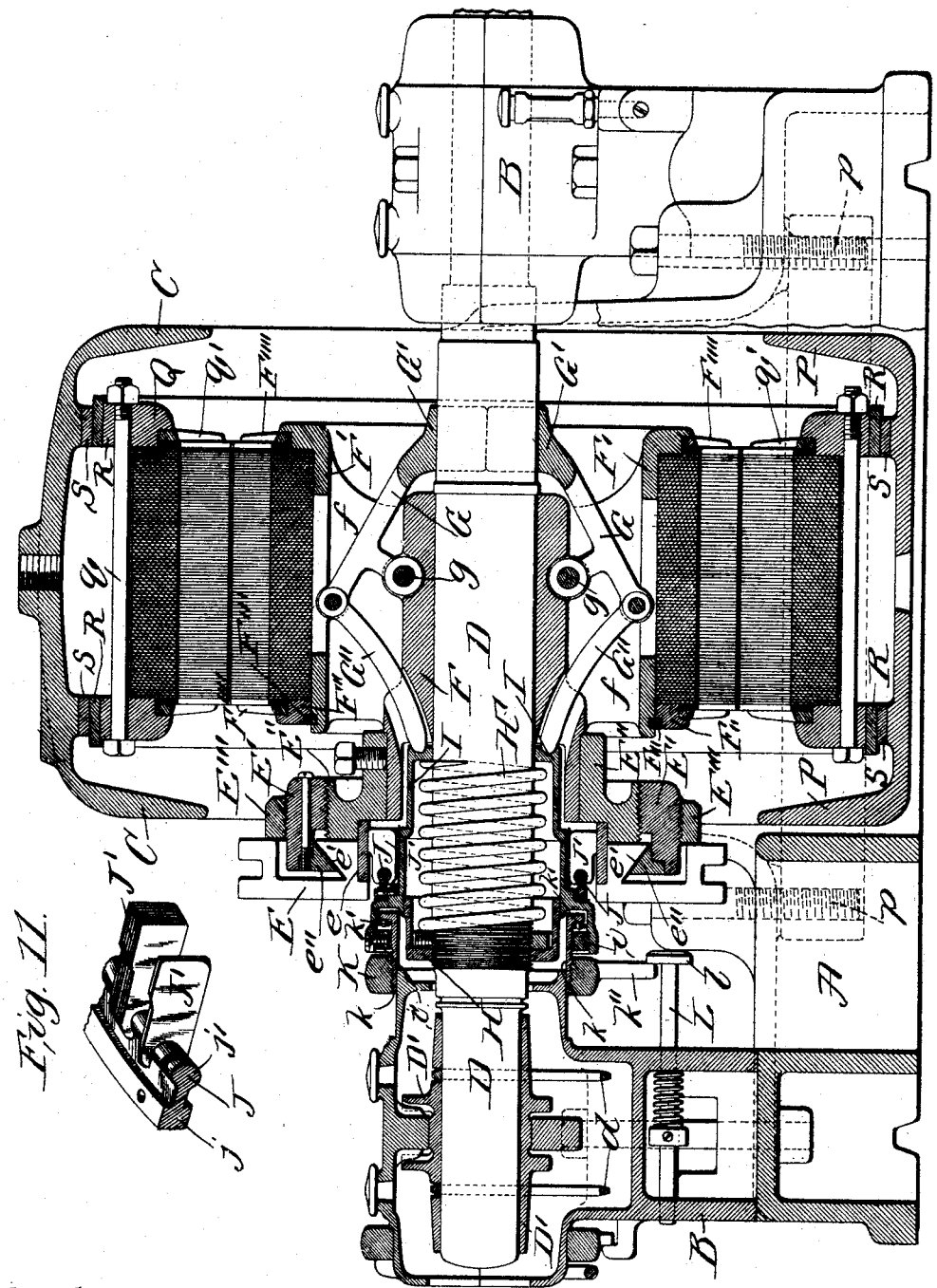

No. 620,609. Patented Mar. 7, 1899.
E. S. PILLSBURY & F. SCHWEDTMANN.
MOTOR.
(Application filed Mar. 18, 1898.)
(No Model.) 6 Sheets—Sheet 3.

Attest:
Wm H Scott
Ralph Kalish

Inventors
Edwin S Pillsbury
Ferd Schwedtmann
by Bakewell & Cornwall
Attys

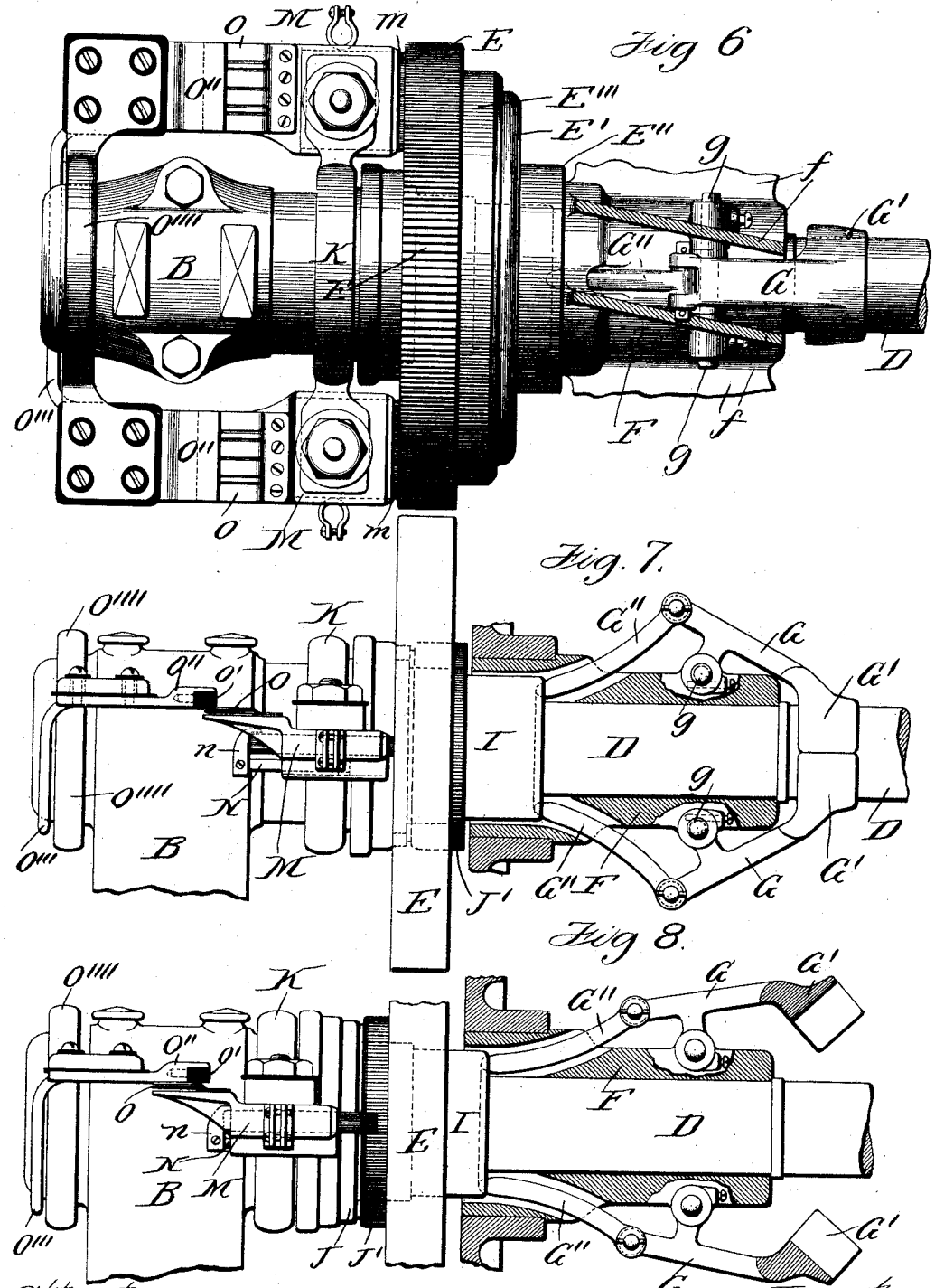

No. 620,609. Patented Mar. 7, 1899.
E. S. PILLSBURY & F. SCHWEDTMANN.
MOTOR.
(Application filed Mar. 18, 1898.)
(No Model.) 6 Sheets—Sheet 5.

Attest
Wm H Scott
Ralph Kalish

Inventors:
Edwin S. Pillsbury
Ferd. Schwedtmann
by Bakewell & Cornwall
Attys

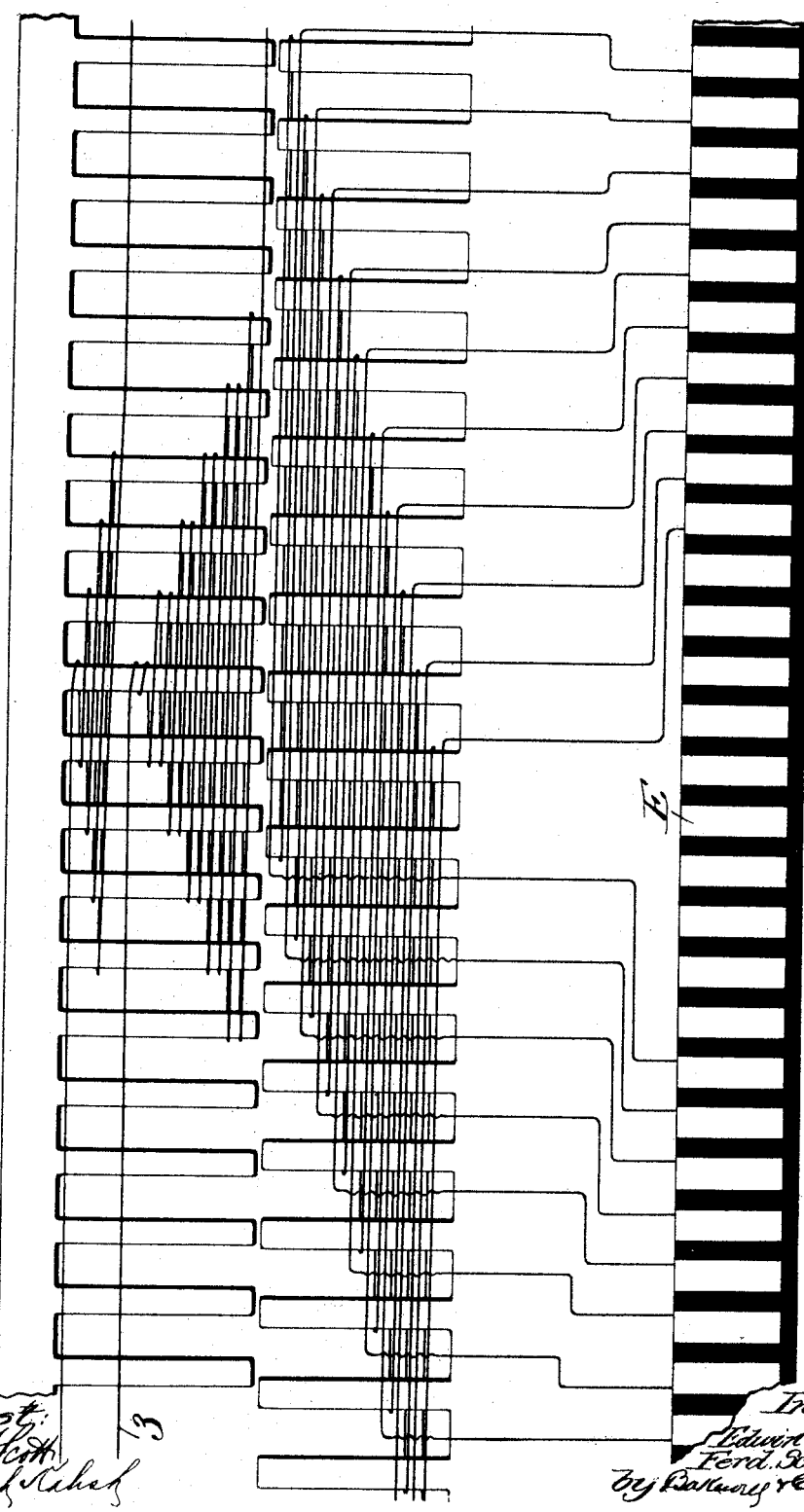

UNITED STATES PATENT OFFICE.

EDWIN S. PILLSBURY AND FERDINAND SCHWEDTMANN, OF ST. LOUIS, MISSOURI.

MOTOR.

SPECIFICATION forming part of Letters Patent No. 620,609, dated March 7, 1899.

Application filed March 18, 1898. Serial No. 674,330. (No model.)

*To all whom it may concern:*

Be it known that we, EDWIN S. PILLSBURY and FERDINAND SCHWEDTMANN, citizens of the United States, residing at St. Louis, State of Missouri, have made a certain new and useful Improvement in Motors, of which the following is a full, clear, and exact description, such as will enable others skilled in the art to which it appertains to make and use the same, reference being had to the accompanying drawings, forming part of this specification, in which—

Figure 4:
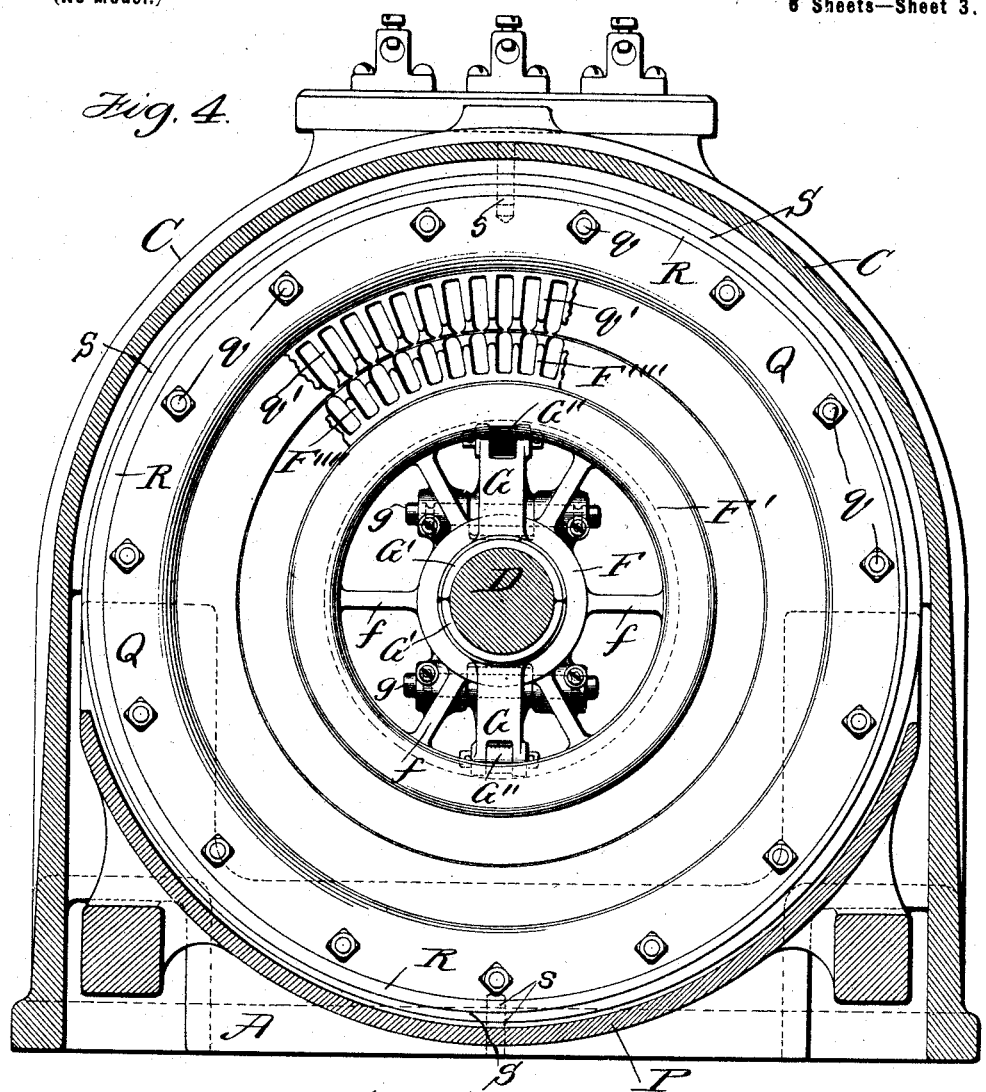
Figure 5:
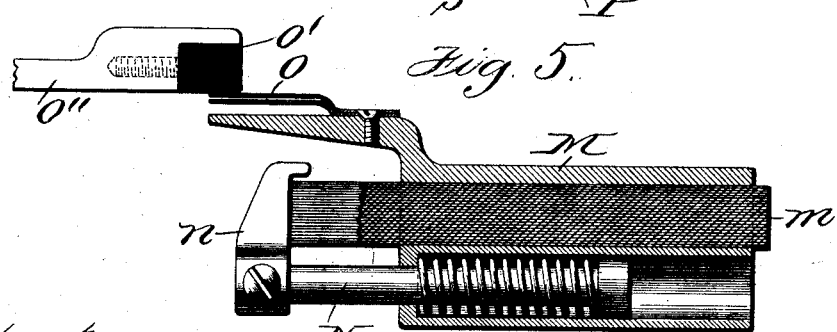
Figure 9:
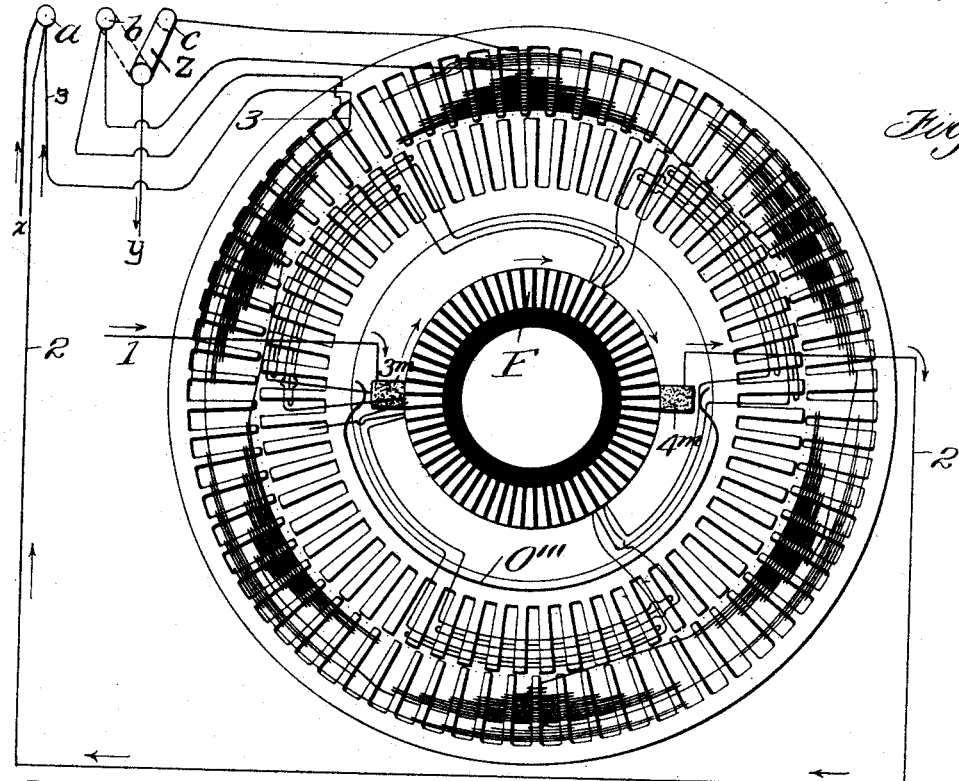
Figure 10:
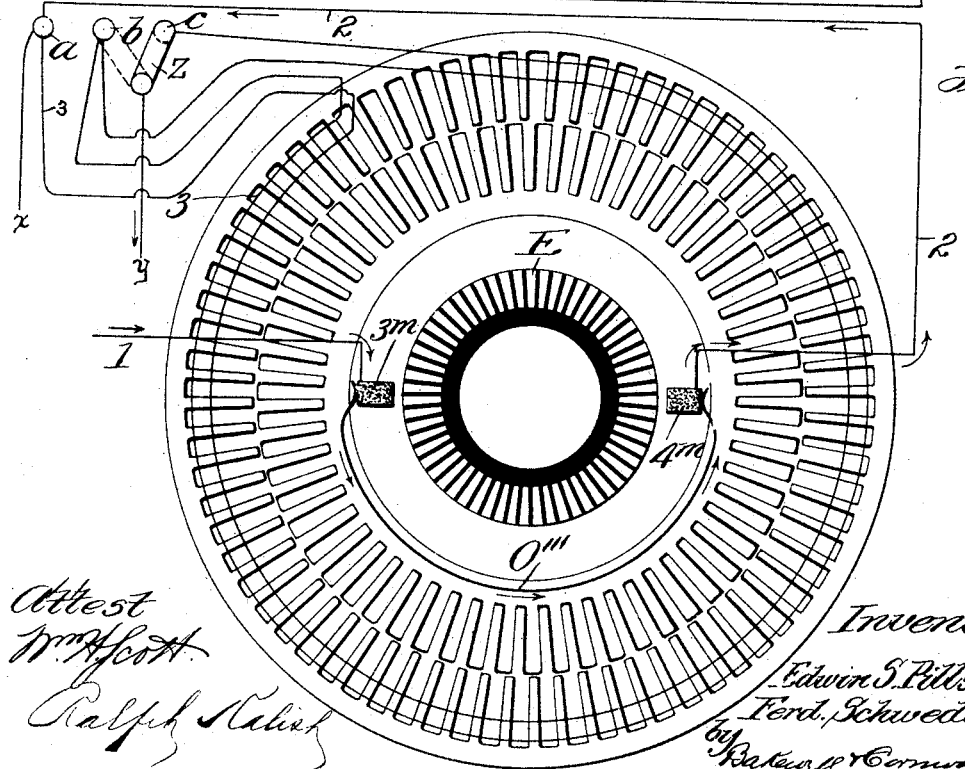

Figure 1 is a longitudinal sectional view through our improved motor. Fig. 2 is a front elevational view of the same. Fig. 3 is a sectional view through one of the journal-boxes. Fig. 4 is a cross-sectional view through the casing, showing the armature and field-magnet poles in elevation. Fig. 5 is an enlarged sectional view illustrating a brush-holder. Fig. 6 is a top plan view of a commutator, brush-holder, and associate parts. Fig. 7 is a detail view, partly in side elevation and partly in section, illustrating the commutator and the brushes in contact therewith. Fig. 8 is a similar view, the parts being shown in a different position—that is, the brushes are not in contact with the commutator. Fig. 9 is a diagrammatic view illustrating the starting position of the motor. Fig. 10 is a similar view illustrating the running position of the motor. Fig. 11 is a detail view of the short-circuiting device, and Fig. 12 is an enlarged diagrammatic view illustrating the windings of the poles of the armature and field-magnet.

This invention relates to a new and useful improvement in electric motors, the object being to construct a motor to run by alternating currents, which motor will develop considerable horse-power and at the same time be very efficient.

The essential features of this invention reside in the novel construction and arrangement of the centrifugal device and its associate parts for electrically connecting the brushes, short-circuiting the commutator, and removing the brushes from said commutator, in the novel construction and arrangement of said short-circuiting devices, in the novel construction and arrangement of the brush-holders and means for electrically connecting the same when they are moved away from the commutator, in the novel construction and arrangement of the field-magnet-core supports and the novel mechanism employed for adjusting said field-magnet-core supports, and in the relative windings of the field and armature, whereby when the motor is in a starting position it runs as a series-motor, the magnetic flux being balanced, so as to eliminate reactance as far as possible from the circuit, other features of invention residing in the construction, arrangement, and combination of the several parts, all as will hereinafter be described and afterward pointed out in the claims.

In the drawings, A indicates the base of the motor, from the ends of which rise suitable pedestals for supporting boxes B, while casing C rises from said base intermediate said pedestals. By preference these pedestals are concaved on their faces, said concavity being described from the axis of the shaft, the boxes being received on these faces. Suitable bolts are provided on each side of the box for securing the same in place.

D indicates a shaft, which is mounted in suitable bearings D', introduced in the boxes B. Suitable means are employed for lubricating the shaft in its bearings, said means being shown in the drawings (see Figs. 1 and 3) as consisting of a ring $d$, suspended from the shaft and rolled thereby, said ring conveying oil from a well in box B to the shaft D.

E indicates the commutator, arranged on the front end of a hub F, fixed to shaft D, said hub F being provided, preferably, with spirally-arranged spokes $f$, which support a rim F', on which the armature is mounted. By arranging spokes $f$ spirally we induce a current of air through the armature-hub, the object being to keep the same cool. Commutator E consists of segments insulated from each other, as is well understood, the inner ends of said segments being stepped to receive an insulation-ring $e$, against which short-circuiting devices, hereinafter described, normally rest. As shown in Fig. 1, these commutator-segments are provided with inclined faces $e'$, against which operates a clamping-ring $e''$, suitably insulated therefrom, said clamping-ring being secured to a ring E', threaded on the supporting-ring E'', which latter ring is clamped to the hub F by suitable set-screws, as before described. By turning the ring E' on the supporting-ring E'' the commutator-segments are clamped in position, which likewise clamps the insulation-ring e in place, after which a ring E''', acting as a jam-nut, is turned up against the commutator-segments, locking the parts in their proper position. Suitable insulation is provided between these parts to prevent short-circuiting through the commutator-segments, except as hereinafter provided for.

G indicates levers pivoted to hub F at g, the rear ends of which levers being provided with weights G', which embrace shaft D when the parts are in their normal position. There are preferably two of these levers G; but it is obvious that more could be employed if desired. Pivotally mounted on the front ends of levers G are fingers G'', operating through suitable openings in hub F. These fingers, when weights G' are thrown outwardly by centrifugal force when the motor attains a high speed, move forwardly and operate certain devices, which will now be described, to short-circuit the commutator-segments, remove the brushes therefrom, and electrically connect said brushes.

Threaded or otherwise secured to shaft D is a spring-seat H, against which abuts the forward end of a coiled spring H', the rear end of said spring exerting a tension upon a sliding sleeve I, bearing upon the shaft D at one end and upon the spring-seat at its other or forward end. This sleeve I is formed with a groove in its rear face, in which operate the fingers G''. Insulated from sleeve I is a track-ring J, which, as shown in Fig. 11, consists of a body portion $j$ and a head $j'$, the two being connected by a shank. The body portion $j$ is secured to the sleeve I by suitable screws, insulation intervening.

J' indicates a series of plates strung on the head $j'$, said plates normally resting within the insulation-ring e. When the sleeve I is moved forward when the motor is operating at a high speed, these plates J' are moved under the forward inner ends of the commutator-segments and held thereagainst by centrifugal force, said plates having a slight movement radially, whereby said commutator-segments are short-circuited. Plates J' are strung close together on the head $j'$, so as to form practically a continuous contact, each plate contacting with the other. The manner of introducing these plates on the head $j'$ is to notch said head and slide as many as possible through the notch, leaving room for closing the said notch, after which the bifurcated end of the other plates introduced receive the head $j'$, the prongs of said bifurcations being bent therearound to embrace said head, but not so tight as to prevent said plates from having a slight radial movement on said ring. This short-circuiting device for the commutator-segments is held in close contact with the interior circumference of said commutator-segments by centrifugal action, said short-circuiting device being practically pivoted on the circular head $j'$. As stated before, in a position of rest these short-circuiting devices are affected by gravity, those of the upper half of the circle resting on the sleeve I and those on the lower half of the circle resting on the insulation-ring e. Under speed, however, they are thrown out by centrifugal force against the insulation-ring e, and when the sleeve I is pushed forwardly they contact with the interior circumference of the commutator-segments.

K indicates what we term the "brush-ring," which is mounted on a sleeve $k$, slidingly arranged on the inner hub of box B. The rear end of this sleeve is provided with an outwardly-extending flange, against which are arranged a series of rollers $k'$, suitably mounted in a loose ring. The forward end of sleeve I extends over the flanged end of sleeve $k$, sleeve I carrying a ring $i$ in said projecting portion, said ring coöperating with the roller-bearing $k'$. The ring $i$ is sufficiently narrow to permit the brush-ring K to have an independent longitudinal movement, which is necessary to secure the best results from the brushes carried by said ring, so as to compensate for wear, &c.

$k''$ indicates a projection extending downwardly from the brush-ring K, which coöperates with a head $l$ of a spring-pressed rod L, said rod assisting in the forward movement of the brushes and preventing the sleeve $k$ from binding on its bearing. This is not so important when the brushes are diametrically opposite each other, as shown in the drawings, but some provision must be made to equalize the bearing of said sleeve, as when the brushes are arranged at an angle of ninety or one hundred and fifty degrees relation to each other, as practiced in some machines.

M indicates brush-holders mounted upon but insulated from lateral projections, extending from the brush-ring K. These brush-holders are best illustrated in Fig. 5, wherein $m$ indicates a brush which is held to the commutator by a cross-head $n$, arranged on a spring-pressed rod N, mounted in the brush-holder. When the brush is in contact with the commutator, this spring exerts a constant pressure against the brush, pressing it firmly against said commutator, but when the brush-holder is moved away from the commutator the spring holds the brush against the commutator until the cross-head is arrested, when the brush-holder and brush will be moved bodily from the commutator. This disengagement of the brushes from the commutator only occurs after the brushes are electrically connected and the short-circuiting plates J' are thrown into an operative position, the object being to prevent unnecessary wear of the brushes.

The forward ends of the brush-holders carry contact-springs O, which when the brush-holders are in a starting position rest under an insulation-piece O', arranged upon the rear under faces of arms O'', which arms are connected by a rod or wire O'''. Arms O'' are supported by a ring O'''', arranged upon the forward end of the front box B, said arms being insulated from said supporting-ring. While we have shown the supporting-ring O'''' as being separate from the box B and locked thereon by a bayonet-joint, it is obvious that supports for the arms O'' can be formed on the boxes. However, we prefer to have the ring O'''' carry the supports, as said supports, with their brush-connecting arms O'', can be adjusted with the brushes. As the brushes move forwardly from under the insulation-pieces O' they contact with the arms O'', which thereby connect said brushes, as shown in Fig. 8.

We have before referred to the casing or dome C as extending from the base A, which, as shown, is for the purpose of housing the field-magnets and armature. Housing C is made integral with base A, said base being formed with an opening under the housing for the introduction of the field-magnets and their support. This support for the field-magnets consists of a casting P, whose upper face is curved concentric with the axis of the machine, said casting having lugs at each side thereof extending forwardly and backwardly under the base A for receiving bolts p, which suspend said casting in position or which clamp the field-magnets in position. This casting is best illustrated in Figs. 1 and 4.

In assembling the field-magnets, or, rather, the stamped laminations formed with polar projections for the field-magnets, said laminations are clamped between rings Q, said rings being held together by through-bolts q. Suitable spiders q' are arranged outside the laminations for well-known purposes. The clamping-rings Q are turned down to a true circle and an eccentric ring R slipped over each of said clamping-rings Q, said eccentric rings being free to move around their supports. Over the rings R are arranged eccentric rings S, but oppositely disposed when introduced, said rings being preferably arranged as shown in Fig. 4—that is, the equal thicknesses being at top and bottom and the thin and thick portions of said rings being at the sides, respectively. The field-magnet core when so assembled is slipped through the bottom of the base, after which the shaft and armature are introduced. As it is desirable that there be a very small space between the armature and the field-magnet polar projections, it is necessary to properly adjust one or the other of said parts so that they will be free to move without contacting with each other. After the shaft is firmly secured in a permanent position the armature or a dummy is rotated, and if such trial develops the fact that said armature is not true with relation to the field-magnet polar projections one or the other, or both, eccentric rings R and S are rotated, shifting the field-magnets up or down, diagonally, or from side to side, as required, until the armature occupies a central position. The casing is preferably turned upside down to accomplish this adjustment of the rings. When this position has been determined, the casting P is introduced and clamped in position and holes are bored through dome C and the casting P and bolts s introduced in the openings, which bolts absolutely lock the parts in a fixed position. By arranging the eccentric rings at each end of the field-magnet core said ends may be adjusted independently of each other to compensate for any irregularity in the field-magnet core in the way of a tilt or cant.

The laminations composing the armature-core are arranged on the hub F, one end of which hub is preferably flanged outwardly, while the other end receives a ring F''' for clamping said laminations in position, said ring being held in place by pins or a split spring-ring F''''. Spiders F'''' are also provided for the laminations of the armature-core.

The winding of the armature is preferably that known as a "progressive" winding, such as shown in Figs. 9 and 10. By reference to Fig. 4, which shows the shape of the laminations composing the armature and field-magnet core, it will be seen that the faces of the cores are provided with transverse grooves whose mouths are contracted. The object of this is to get as much surface area as possible and to prevent humming.

The number of polar projections on the armature is preferably such that a complete circuit around the armature recedes one polar projection behind the starting-place, thus making the winding a "retrogressive" one. Instead of the single circuit receding one segment or projection behind the starting-place the armature can be so arranged that the last coil of a complete circuit would terminate one segment ahead of the starting-point, making the winding a progressive instead of a retrogressive one. This winding is alive throughout its entire length at all times, as the brushes are wide enough to make contact with the advance segment before it leaves the other behind. Of course when the windings are short-circuited the brushes are useless, and these windings are not then alive in the sense that they conduct an active or primary current, but act as induced or secondary current conductors.

The field-magnet winding is such that the intensity of the magnetic lines of force are more intense in the center of the pole than at each side, they decreasing in strength as they approach the ends, which ends are practically neutral. In this manner we get a symmetrical field. We extend this field-magnet winding so as to include the eleven polar projections, continuing this winding to the next pole in advance, which is wound in an opposite direction, and so on through the entire field, leading the wire from the last coil to a binding-post $b$, the post $a$ being connected to the supply-wire $x$. From post $b$ we lead another wire, which is wound around the polar projections parallel with the first winding. This second winding, we will say, has one turn around the polar projections, while the first winding had three and one-half turns, or in about this proportion. This second winding is led to a post $c$, whence the current is let out by a return-wire $y$. To either post $b$ or $c$ the return line-wire is connected by a switch $z$. If to the former, the second winding is dead, making fewer turns in the field-magnets and requiring less voltage than where the return line-wire is connected to post $c$. When the return line-wire is connected to post $c$, the motor will run with greater efficiency under light loads, consuming less current.

In operation we will assume that the current enters the motor through wire 1, being led to brush $3^m$, traversing the progressive windings of the armature, after which it is led to post $a$ by brush $4^m$ and wire 2. From post $a$ it enters the field through wire 3, traversing the several coils of the first winding of the field-magnets and the second winding also if the return line-wire is connected to post $c$. When the motor has attained a high speed, the centrifugal force will throw the weights $G'$ outwardly, causing the end thrust of the fingers $G''$ to move sleeve I forwardly. This sleeve, carrying the short-circuiting plates $J'$, will electrically connect the brushes through the medium of the arms $O''$ and the connecting-piece $O'''$, after which the commutator will be short-circuited, and finally the brushes are removed from the commutator. The current now passes, as indicated in Fig. 10, in which it will be seen that the progressive windings of the armature are inactive in the sense that they have any primary current passing through them, the brushes being away from the commutator. The motor now runs as an induction-motor, the currents induced in the armature developing a torque, which causes the armature to rotate.

The armature and field-magnet are so proportioned regarding their windings that the magnetic flux developed in each when the motor is starting is balanced against the other with reference to their respective magnetomotive forces, this being done to eliminate reactance as far as possible from the circuit. The brushes are so arranged as to make contact with the commutator and cause the position of the armature-poles to be nearly opposite those developed by the field-magnet windings, the action between the two being repulsion, their respective magnetic flux calculated to kill each other. Motion in either direction is caused by displacing the position of these fields a very little one way or the other, depending upon the direction in which it is desired the motor shall run. This arrangement enables us to develop a large starting torque with the absorption of a minimum amount of current from the circuit. The weights $G'$, which actuate the brushes, closely hug the shaft D, so that when speed is attained and said weights thrown outwardly the motion will be quick, as will likewise their closing movement.

We are aware that many minor changes in the construction, arrangement, and combination of the several parts of our motor can be made and substituted for those herein shown and described without in the least departing from the nature and principle of our invention.

Having thus described our invention, what we claim, and desire to secure by Letters Patent, is—

1. In a motor, the combination with field-magnets of an armature and its windings, a commutator therefor, brushes coöperating with said commutator, an insulation-ring on said commutator, pivotally-mounted centrifugally-operated short-circuiting plates which normally rest against said insulation-ring, and centrifugally-operated devices for drawing said plates into engagement with the commutator-segments when the motor has attained speed; substantially as described.

2. In a motor, the combination with field-magnets, of an armature and its windings, a commutator therefor, longitudinally-movable brushes, which in starting, coöperate with said commutator, an insulation-ring on said commutator, pivotally-mounted centrifugally-operated short-circuiting plates, which rest against said insulation-rings when the commutator is starting, a mechanism which is operative when the motor has attained speed, for moving said brushes longitudinally out of engagement with their commutator, said means also moving said short-circuiting plates into engagement with the commutator-segments; substantially as described.

3. In a motor, the combination with the field-magnets, of an armature and its windings, a commutator therefor, an insulation-ring on said commutator, pivotally-mounted centrifugally-operated short-circuiting plates, which rest against said insulation-ring when the motor is starting, brushes which coöperate with the commutator when the motor is starting, said brushes being longitudinally movable, contact devices coöperating with said brushes for electrically connecting them when they are disengaged from the commutator, and levers which are automatically operated when the motor has attained a high speed, for moving the brushes longitudinally out of engagement with the commutator, and electrically connecting said brushes, said levers also throwing the short-circuiting plates into engagement with the commutator-segments; substantially as described.

4. In a motor, the combination with the field-magnets, of an armature, a commutator, an insulation-ring on said commutator, a longitudinally-movable sleeve arranged in juxtaposition to the commutator, a track-ring carried by said sleeve, centrifugally-operated short-circuiting plates, which are arranged close together on said track-ring, and which normally rest against the insulation-ring of the commutator, but, when moved outwardly, engage the commutator-segments and short-circuit the same, and means for automatically moving said sleeve, its carrying track-ring and short-circuiting plates, longitudinally when the motor has attained a high speed; substantially as described.

5. In a motor, the combination with the field-magnets, of an armature, a commutator, an insulation-ring on said commutator, pivotally-mounted centrifugally-operated short-circuiting plates which normally rest against said insulation-ring, and means for throwing said plates into engagement with the commutator-segments when the motor has attained speed, substantially as described.

6. The combination with the field-magnets, of an armature, a commutator and its shaft, a sleeve slidingly mounted on said shaft, pivotally-mounted short-circuiting devices carried by said sleeve, a spring for normally holding said sleeve in such position that its carried short-circuiting devices will be out of engagement with the commutator, thrust-fingers bearing against said sleeve, and pivoted weights which are adapted to be thrown by centrifugal force to operate said thrust-fingers, and force the sleeve against its spring for throwing the short-circuiting device into contact with the commutator-segments, to short-circuit the segments, substantially as described.

7. In a motor, the combination with the field-magnets, of an armature, a commutator and its shaft, a spring-seat fixed to said shaft, a sleeve slidingly mounted in said shaft, a spring interposed between said seat and sleeve, short-circuiting devices carried by said sleeve, thrust-fingers which operate against the end of said sleeve and against said spring, pivoted levers to which said thrust-fingers are connected, said levers carrying weights on their ends which embrace said shaft, substantially as described.

8. The combination with a commutator, of an insulation-section adjacent thereto, a longitudinally-movable sleeve carrying a track-ring, an annular series of independently-movable contact-plates, pivotally mounted on said track-ring and normally resting upon said insulation-section, and means for moving said sleeve and its carried parts longitudinally so that said contact-plates will be thrown outwardly by centrifugal force when the motor is running at high speed, for short-circuiting the commutator; substantially as described.

9. The combination with a commutator of an insulation-ring mounted thereon, a longitudinally-movable sleeve in juxtaposition to said commutator, a track-ring carried by said sleeve, an annular series of short-circuiting plates for coöperating with the commutator-segments when said sleeve is moved longitudinally, and said plates are thrown outwardly by centrifugal force, a spring bearing against said sleeve, whose tension is to normally hold the same in an inner position, and centrifugal devices which coöperate with said sleeve to move the same outwardly against the tension of its spring; substantially as described.

10. The combination with a commutator, of a support J having a head j', and plates J' which embrace said head, said plates being grouped close together within the commutator with which they are adapted to engage by centrifugal force, substantially as described.

11. In a motor, the combination with the field-magnets, the armature and its shaft, of a winding for said armature, a commutator for said winding, brushes for said commutator, spring-pressed sleeve slidingly mounted on said shaft, centrifugal devices for sliding said sleeve on its shaft when the motor has attained speed, and an independently-movable sleeve on which said brushes are mounted, said brush-sleeve being actuated by the first-mentioned sleeve, substantially as described.

12. The combination with a commutator, of brushes, brush-holders, a sliding sleeve in which said brush-holders are mounted, a spring-pressed rod engaging one side of said sleeve, a spring for holding said sleeve in its normal position and centrifugal devices for operating said sleeve against said last-mentioned spring, substantially as described.

13. The combination with a commutator, of spring-pressed brushes, brush-holders for said brushes, a sliding sleeve on which said brush-holders are mounted, a centrifugal device for automatically disengaging said brushes from the commutator, when the motor has attained speed, and means for electrically connecting said brushes when they are disengaged from the commutator.

14. The combination with an armature and its shaft, of a commutator, brushes coöperating with said commutator, a longitudinally-movable brush-holder, contact-making devices projecting forwardly and in electrical connection with said brushes, insulation-pieces, on which said contact-making devices normally rest, a metallic connection arranged in advance of said brush-contacts, and means for moving the brush-holder and its carried brushes forwardly so as to electrically connect said brushes before they are disengaged from the commutator; substantially as described.

15. The combination with a commutator, of brush-holders carrying brushes adapted to coöperate with said commutator, contact-pieces arranged on the forward ends of said brush-holders, means for moving said brush-holders and brushes out of engagement with the commutator, insulation on which said contact-pieces rest when the brushes are in engagement with the commutator, and a metallic connection in the path of said contact-pieces for electrically connecting the brushes when the same are disengaged from the commutator and slid longitudinally, substantially as described.

16. The combination with a commutator, of brush-holders carrying brushes coöperating therewith, springs for forcing said brushes into contact with the commutator, means for disengaging the brushes from the commutator and sliding the same longitudinally on the commutator-shaft, said brush-springs causing the brushes to remain in contact with the commutator while said actuating means is initially moving the brush-holders, and a device for electrically connecting the brushes before the brush-holders leave the commutator, substantially as described.

17. The combination with a field-magnet core and its support, or supports, of an eccentric ring interposed between said core and its support, or supports, substantially as described.

18. The combination with the field-magnet core and its support, or supports, of a plurality of eccentric rings interposed between said core and its support, or supports, substantially as described.

19. The combination with a field-magnet core, of an eccentric ring or rings arranged thereon at each end, which rings, when rotated, are adapted to adjust said core relative to its supports, substantially as described.

20. The combination with a field-magnet core, of oppositely-arranged eccentric rings superimposed one above the other and locked at the ends of said core, whereby, when said rings are rotated, the position of the field-magnet core relative to its supports, may be adjusted in any direction, substantially as described.

21. The combination with a field-magnet core and its clamping-ring, of supports for said field-magnet core, and eccentric rings R and S arranged between said clamping-ring and the supports, substantially as described.

22. The combination with the housing C, of a field-magnet core having clamping-rings Q at its ends, a supporting-casting P, and eccentric rings R and S coöperating with said clamping-rings and housing C and casting P for adjusting said field-magnet core, substantially as described.

In testimony whereof we hereunto affix our signatures, in the presence of two witnesses, this 11th day of March, 1898.

EDWIN S. PILLSBURY.
FERDINAND SCHWEDTMANN.

Witnesses:
F. R. CORNWALL,
RALPH KALISH.